(12) United States Patent
Weisbrot et al.

(10) Patent No.: US 9,336,323 B2
(45) Date of Patent: May 10, 2016

(54) METHOD AND SYSTEM FOR ACCELERATING SURFING THE INTERNET

(75) Inventors: Asaf Weisbrot, Mishmeret (IL); On Kalich, Tel-Aviv (IL)

(73) Assignee: FLASH NETWORKS, INC., Herzlia (IL)

( * ) Notice: Subject to any disclaimer, the term of this patent is extended or adjusted under 35 U.S.C. 154(b) by 2350 days.

(21) Appl. No.: 11/829,082

(22) Filed: Jul. 26, 2007

(65) Prior Publication Data

US 2008/0034031 A1 Feb. 7, 2008

Related U.S. Application Data

(60) Provisional application No. 60/821,403, filed on Aug. 4, 2006.

(51) Int. Cl.
*G06F 15/16* (2006.01)
*G06F 17/30* (2006.01)
*H04L 29/08* (2006.01)

(52) U.S. Cl.
CPC .......... *G06F 17/30902* (2013.01); *H04L 67/02* (2013.01); *H04L 67/28* (2013.01); *H04L 67/2852* (2013.01)

(58) Field of Classification Search
CPC .............. G06F 17/30902; H04L 67/28; H04L 67/2852; H04L 67/02

USPC .......... 709/203, 218, 219; 711/100, 113, 118, 711/119, 123, 126, 137
See application file for complete search history.

(56) References Cited

U.S. PATENT DOCUMENTS

| | | | |
|---|---|---|---|
| 5,946,697 A | 8/1999 | Shen | |
| 6,249,844 B1 | 6/2001 | Schloss et al. | |
| 6,640,284 B1 | 10/2003 | Shaw et al. | |
| 6,654,766 B1 | 11/2003 | Degenaro et al. | |
| 6,775,695 B1 * | 8/2004 | Sarukkai | G06F 17/30902 707/999.002 |

(Continued)

FOREIGN PATENT DOCUMENTS

WO    WO 01/20485 A2    3/2001
WO    WO01/20485 A2     3/2001

(Continued)

*Primary Examiner* — Mohammad A Siddiqi
(74) *Attorney, Agent, or Firm* — Smith Tempel; Gregory Scott Smith

(57) ABSTRACT

The delivery of content is improved from a user's perspective by encouraging the cache of user devices to maintain more current data prior to requesting web pages that would invoke the download of the more current data. A cache simulation of the cache in the user devices is maintained. When objects within the cache simulator are expected to require updating, actions are taken to encourage the user device to update the cache. The actions include modifying markup language files that are downloaded to the user device to invoke the update. For instance, artificial URL's that request the updated objects, embedded scripts, user selection objects, or the like are used to invoke an update process.

17 Claims, 4 Drawing Sheets

(56) References Cited

U.S. PATENT DOCUMENTS

| | | | |
|---|---|---|---|
| 6,941,310 B2* | 9/2005 | Ahad et al. | 707/100 |
| 7,099,926 B1* | 8/2006 | Ims et al. | 709/217 |
| 7,161,914 B2* | 1/2007 | Shoaib et al. | 370/331 |
| 7,277,942 B2* | 10/2007 | Inoue et al. | 709/225 |
| 7,437,509 B2* | 10/2008 | Vayssiere | 711/118 |
| 7,587,398 B1* | 9/2009 | Fredricksen et al. | 707/10 |
| 8,301,839 B2* | 10/2012 | Sundarrajan | G06F 12/0808 711/133 |
| 2001/0052052 A1* | 12/2001 | Peng | 711/133 |
| 2002/0065875 A1* | 5/2002 | Bracewell | G06F 9/463 709/203 |
| 2002/0147912 A1 | 10/2002 | Shmueli et al. | |
| 2003/0188021 A1 | 10/2003 | Challenger et al. | |
| 2007/0185971 A1* | 8/2007 | Idan | H04L 63/12 709/217 |
| 2007/0198716 A1 | 8/2007 | Knowles et al. | |
| 2007/0233898 A1* | 10/2007 | Raviv et al. | 709/238 |

FOREIGN PATENT DOCUMENTS

| | | |
|---|---|---|
| WO | WO2006127750 A1 | 11/2006 |
| WO | WO2006127876 A2 | 11/2006 |
| WO | WO2007008291 A1 | 1/2007 |

* cited by examiner

METHOD AND SYSTEM FOR ACCELERATING SURFING THE INTERNET

CROSS-REFERENCE TO RELATED APPLICATIONS

This application is being filed under 37 C.F.R. 1.53(b) as a non-provisional patent application and claiming the benefit of the filing date of U.S. Provisional Application for Patent filed on Aug. 4, 2006 and assigned an application Ser. No. 60/821,403. Such application is hereby incorporated by reference.

BACKGROUND OF THE INVENTION

The present invention relates to data communication, and more particularly, to the field of browsing the Internet.

During the recent years, usage of data communication has increased. One popular method of data communication is surfing a network, such as but not limited to the Internet. The term "surfing" generally is defined as using a browser application to retrieve information embedded within web pages stored at one or more content servers. It should be noted that the terms "surfing" and "browsing" are used interchangeably herein. Surfing the Internet can be done by connecting a user to the Internet via an access network. An exemplary access network can be a wireless Internet service provider, a cellular service provider, satellite service provider, WiFi service provider, etc. A common data communication session can be based on a data communication protocol, such as but not limited to the Internet Protocol (IP).

A "Web page," is a file or document created for use in the World Wide Web environment (hereinafter, "Web"). Web pages are typically located using a "URL," which stands for Uniform Resource Locator, which is a form of address adapted for use in the distributed network environment of the Web. Web pages are typically encoded in a Markup Language (ML), such as but not limited to, Hyper Text Markup Language, or (HTML), Extensible Markup Language (XML), Wireless Markup Language (WML), XHTML, CHTML, WMLC, etc. Some of these languages can be used by cellular devices. A browser is a software application running on a user device that is adapted or functional to process Web documents.

In addition to web pages, other content pages may be created by using Markup Languages. These pages can be used over private networks, portals, organizational servers, etc. Henceforth, the description of the present invention may use the term 'web page' as a representative term for any of the above group or as general, displayable content created or defined by a Markup Language.

A common Web page includes a plurality of links to other pages or information. Some of the links are associated with objects of text as well as graphics, images, sound files, and perhaps video that belongs to the same web page. Usually those links are retrieved automatically by the browser while processing the current web page. The discloser of this application refers to those links as browser's links. Other links may be associated with other web pages, which are selected by the user according to his preference. Those links are referred as user's links or navigation links.

A common surfing session may start by requesting a home page of the portal that serves the user. For a user that uses a cellular device, for example, the home page of the portal can be the home page of the cellular service provider. In order to give a "homely" feeling to the surfer and to create a branding effect, the home page, as well as other pages of the portal, may have a stable site structure that may change infrequently. Furthermore, most of the pages in the portal include a logo that is associated with the portal, a similar navigation section, etc. that repeats in or is duplicated across two or more pages. In addition to the stable structure, changeable information may be added to the page. The changeable information can include items such as, but not limited to, news, advertising of local shops located close to the current location of the user, weather forecasting, etc. Fetching the home page and other pages of the portal may take a long time because a page can include images, graphics, etc.

To avoid re-fetching of the same information (repeating information) in next or future requested pages, a browser commonly uses a cache that stores the last received or most recently received information. However, common portal pages are configured to have a zero or very short expiration date, cache period, to reduce the risk of skipping and not displaying an update in the changeable information, such as in the news or advertisement. Therefore surfing the portal may take a long period of time, even though the portal may contain repeatable information. The long period of time adversely effects the user experience, especially when the user is connected via a long thin network (LTN). A LTN can represent a network having a limited bandwidth and/or high latency, such as but not limited to a cellular network, satellite, etc.

Therefore there is a need for a system and a method for enabling the use of cache within a user's device to eliminate the need for re-fetching of the same information of web pages and objects. Furthermore, there is a need for a technique for updating the information in the cache within a user's device, with changes to pages or information that occur between the times that the information is initially loaded into the cache of the user's device and the current time or the current status of the page at the portal. The operation of the system can be transparent to the user's device as well as to the web server that stores the web pages.

Such a new system can increase the quality of the user's experience by reducing the response time to a user's request. Accelerating the response can be achieved by updating its cache with the latest updates prior to requesting those updates. Pushing the updates can be done while the connection is not used for carrying a user's request or response to a last request. Transparent updates can be done during the time that a user reads a previously received page, for example.

BRIEF SUMMARY OF THE INVENTION

Different embodiments of the present invention solve the above-described needs by providing a system and/or method for managing a database housing an estimated replication of each one of the caches at the users' devices. The estimated replication of a users' caches can be referred to as a cache simulator. From time to time the cache simulator can be updated to include information that has been changed at a content server. The updated information can be rendered to update the user devices, and can be stored in the cache of the user devices prior to being requested by the user.

The system can intercept data communications between a surfer's device and a content server, such as but not limited to, a portal of the service provider. The system then modifies the expiration date of the page or object and sets it to a pre-configurable period, such as but not limited to tens of minutes up to a few days or even perpetual. The system then determines whether the cache of the user device requires updating and if so, pushes the required updated information toward the user device prior to receiving a relevant request. The updated information can be objects or pages. It should be noted that the terms "content server", "web server", "portal" and "server" may be used interchangeably herein. Henceforth, the description of embodiments of the present invention may use the term 'server' as a representative term for any of the above group or any other type of server that may be surfed by a user.

In one exemplary embodiment of the present invention, the process of checking whether a cache update session for a user's device is needed can be performed when a connection with the user's device is established. In alternate exemplary embodiment of the present invention, the decision can be performed periodically by examining the user's cache simulator, one after the other, in a cyclic mode. Yet in another embodiment of the present invention, the decision can be initiated by the server when a change in the server occurs, etc.

An exemplary embodiment of the present invention may push updated information (e.g. pages or objects) by reversing roles with the user device. Several methods can be used for pushing updated information. In one exemplary embodiment of the present invention, a transparent push method can be used. In a transparent push, a response to a requested web page may be modified to include a browser's link to a transparent object without adding a visual reference to this transparent object. The transparent object includes a URL that is not stored in the cache of the user's device. Therefore the transparent object will be requested by the browser of the user device. Upon receiving a request to deliver the transparent object, an embodiment of the present invention may deliver one or more objects that can be later requested, by the user, and are not included in the cache of the user device or the updated version of the one or more objects is not stored in the cache of the user device.

An alternate exemplary embodiment of the present invention may use a non-transparent-push method. When a non-transparent-push method is used, a requested web page is modified to include a selection object offering the user the option to update the cache of his device. Upon receiving a request to update the cache, an exemplary embodiment of the present invention responds by delivering one or more updated objects, using the multi-part option, or an ML file with a list of objects.

Other exemplary embodiments of the present invention may modify a response to a user's request and add a Java Script to the response. The Java Script is transparent to the user and automatically initiates a request for updates.

Furthermore, some embodiments of the present invention may learn the user's behavior in order to improve the user's experience. For example, an embodiment of the present invention may learn the time interval between consecutive requests of the user. A parameter, such as but not limited to, an average time interval between consecutive requests of the user can be used to define a maximum duration for pushing updates.

Additionally and/or alternatively, an embodiment of the present invention may learn the pattern of different flows. For example, one pattern reflects a common behavior of a user that goes from page 'A' to 'B', from 'B to 'D' and from 'D' to 'F', etc. Based on such a pattern, an embodiment of the present invention may create an update cycle in the same order to deliver the most update information at the appropriate timing. Therefore when the user requests page 'A', the exemplary embodiment may update the cache with the new information embedded in page 'B', etc. Yet an alternative embodiment of the present invention may use any combination or all the above methods. Defining the combination may be dependent on the behavior of the user. Each user may have a different set of the above presented methods.

Exemplary embodiments can be transparent to the user's device as well as to the server. Other objects, features, and advantages of the present invention will become apparent upon reading the following detailed description of the embodiments with the accompanying drawings and appended claims.

DETAILED DESCRIPTION OF THE INVENTION

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1:
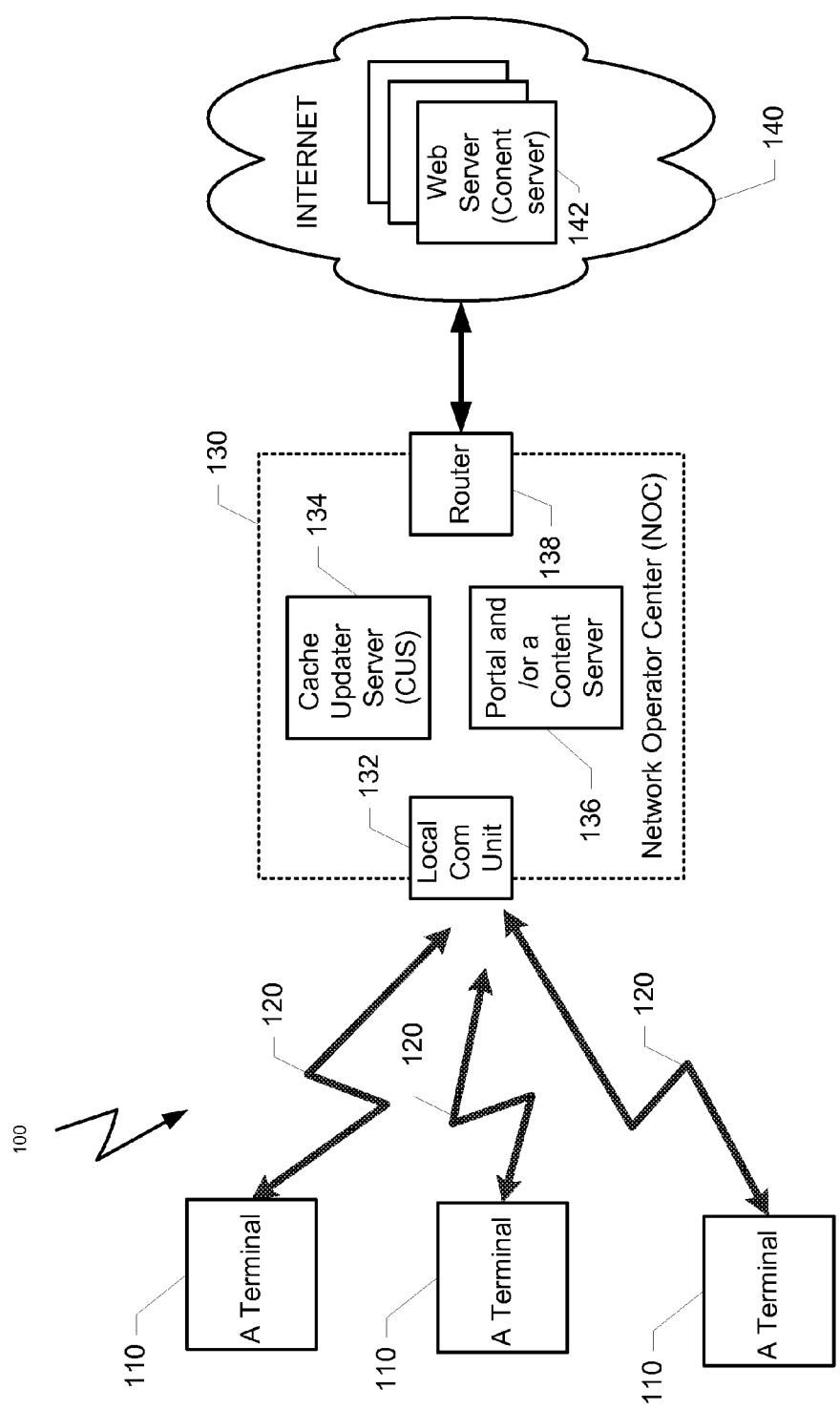
FIG. 1 illustrates a block diagram with relevant elements of an exemplary communication system that implements an exemplary embodiment of the present invention.

FIG. 1 depicts a block diagram with the relevant elements of an exemplary communication system 100 that implements an exemplary embodiment of the present invention. A communication system 100 has been selected as an exemplary environment that is suitable for implementing exemplary embodiments of the present invention. The communications system 100 may be a cellular data communication network, satellite networks, access networks, Internet Service Provider (ISP), or other type of network or communication system. Within the context of this description, the terms cellular, satellites, wireless, and ISP may be used interchangeably and at times, may have the same meaning.

System 100 may comprise a plurality of terminals 110; communication links 120; a network operator center (NOC) 130, a network 140 such as but not limited to the Internet, which can be referred also as the world wide web (WWW); and one or more Content Servers 142. An exemplary NOC 130, among other elements, may comprise a local communication unit 132, a cache updater server (CUS) 134, a router 138 and a portal 136 of the service provider. Exemplary embodiments of the present invention can refer to the portal 136 as one of the content servers 142. Usually the data communication between the different elements of the NOC 130 is based on the Internet protocol. (IP).

It will be appreciated by those skilled in the art that depending upon its configuration and the needs, system 100 may comprise more than three Content Servers 142 and three terminals 110. However, for purposes of simplicity of understanding, three units of each are shown. It should be noted that the terms "content server", "web server" and "proxy server" may be used interchangeably herein. Henceforth, the description of embodiments of the present invention may use the term 'server' as a representative term for a content server a web server or a proxy server or any other type of server that may be surfed by a user. It should be noted that the terms "client", "user's device", "terminal", "surfer" and "user" may be used interchangeably herein.

System 100 is based on the Internet Protocol (IP). System 100 may represent one or more networks segments, including but not limited to one or more Internet segments, one or more Intranets, etc. System 100 may run over one or more type of physical network, such as but not limited to, the Public Switched Telephone Network (PSTN), the Integrated Services Digital Network (ISDN), a cellular network (G2, G3 & G3.5), a satellite network, etc. It may run also over a combination of these network types. System 100 may include intermediate nodes along the connection between a client 110 and a content server 142. The intermediate node may include, but is not limited to, IP service provider servers, cellular service provider servers and other type of service providers equipments.

A plurality of terminals 110 may be served by the System 100 and capable of accessing the content servers 142 and/or the portal 136 via the NOC 130 and the Internet 140. A common terminal 110 may run a browser software application in order to surf the network and to communicate with one or more content servers 142/136. Exemplary, but not limited, browser applications can be the one available from Openwave Systems Inc. or OPERA MOBILE BROWSER, INTERNET EXPLORER, etc. Exemplary terminal 110 can be a personal computer (PC), a notebook computer, a cellular phone, handheld computer, a personal data assistant (PDA), or any other computing device with wire or wireless communication capabilities, etc.

The plurality of terminals 110 can be connected via a long thin network (LTN) of data links 120 to local communication unit 132 within the NOC 130. The connection between the terminals 110 and the NOC 130 may be via intermediate nodes (such as a base station, etc.) not shown in FIG. 1. The local communication unit 132 acts as an access gateway between the network protocol that is used over the long thin network 120 and the IP network that is used over the NOC 130. In some embodiments of the present invention, the local communication unit 132 may act also as an Authentication, Authorization, and Accounting (AAA) agent for the client 110. Exemplary local communication unit 132 may be a Gateway GPRS Support Node (GGSN) or Packet Data Serving Node (PDSN) or any other similar network nodes.

Router 138 is the interface between the Internet 140 and the NOC 130. Router 138 may route the upload communication toward the appropriate destination over network 140. When the upload transportation is a request for content objects, router 138 routes the request to the appropriate content server 142. In the download direction, the router 138 receives incoming packets from the different content servers 142 and distributes them to the appropriate modules of the NOC 130. In a common NOC 130, which does not utilize a CUS 134, packets that are targeted toward a terminal are transferred to the local communication unit 132.

An exemplary embodiment of cache updater server (CUS) 134 can intercept traffic being communicated between the local communication unit 132 and the router 138 and receive all the packets that are flowing between the local communication unit 132 and the router 138. Therefore the CUS 134 receives the data transportation that is transferred between the plurality of terminals 110 and the plurality of the content servers 142, as well as the data transportation that is transferred between the plurality of terminals 110 and the portal 136. In one exemplary embodiment, the CUS 134 may be configured as the next hop for both sides of the NOC 130, (i.e., for local communication unite 132 and for the router 138 as well as for the portal 136).

In another exemplary embodiment, the CUS 134 may physically reside between the local communication unit 132 and the router 138. In both cases, the CUS 134 may be transparent to both sides of the connection, to the terminal 110 and/or to the content servers 142/136. In an alternate exemplary embodiment of the present invention, the CUS 134 may use an HTTP proxy as an interface structure. In one embodiment, the HTTP proxy can be a transparent proxy. In an alternate exemplary embodiment, the HTTP proxy can be a non-transparent proxy. In such a case, the terminals 110 can be configured to communicate via the CUS 134. Some exemplary embodiments of the present invention may use a redirector. The redirector can collect packets coming from the plurality of terminals 110 toward the plurality of the content servers (142/136) and redirect the packets toward the CUS 134. An exemplary redirector can be a Content Inspection Director (CID) (a product of Radware Ltd, Israel).

The CUS 134 can manage a cache database that stores an estimated cache replication of the cache in terminals 110 (a cache simulator). From time to time the cache simulator can be updated to include information that has been changed at the one or more of the content servers 142 and or the portal 136. The updated information can be rendered to the terminals 110, thereby updating the cache within the terminals 110, prior to the user making a request for the updated content from the content servers 142 or the portal 136.

An exemplary CUS 134 can (a) intercept data communication between one or more of the terminals 110 and the one or more content servers 142/136, such as but not limited to portal 136 of the service provider; (b) modify the expiration date of the requested or pre-fetched page or object to a pre-configurable period, such as but not limited to tens of minutes up to a few days or even forever; (c) determine whether the cache of the terminal 110 requires updating and pushing the required updated information toward the terminal 110 prior to receiving a relevant request from the terminal 110. The updated information can include objects or pages. More information on the operation of the CUS 134 is depicted below in conjunction with FIGS. 2, 3 & 4.

Figure 2:
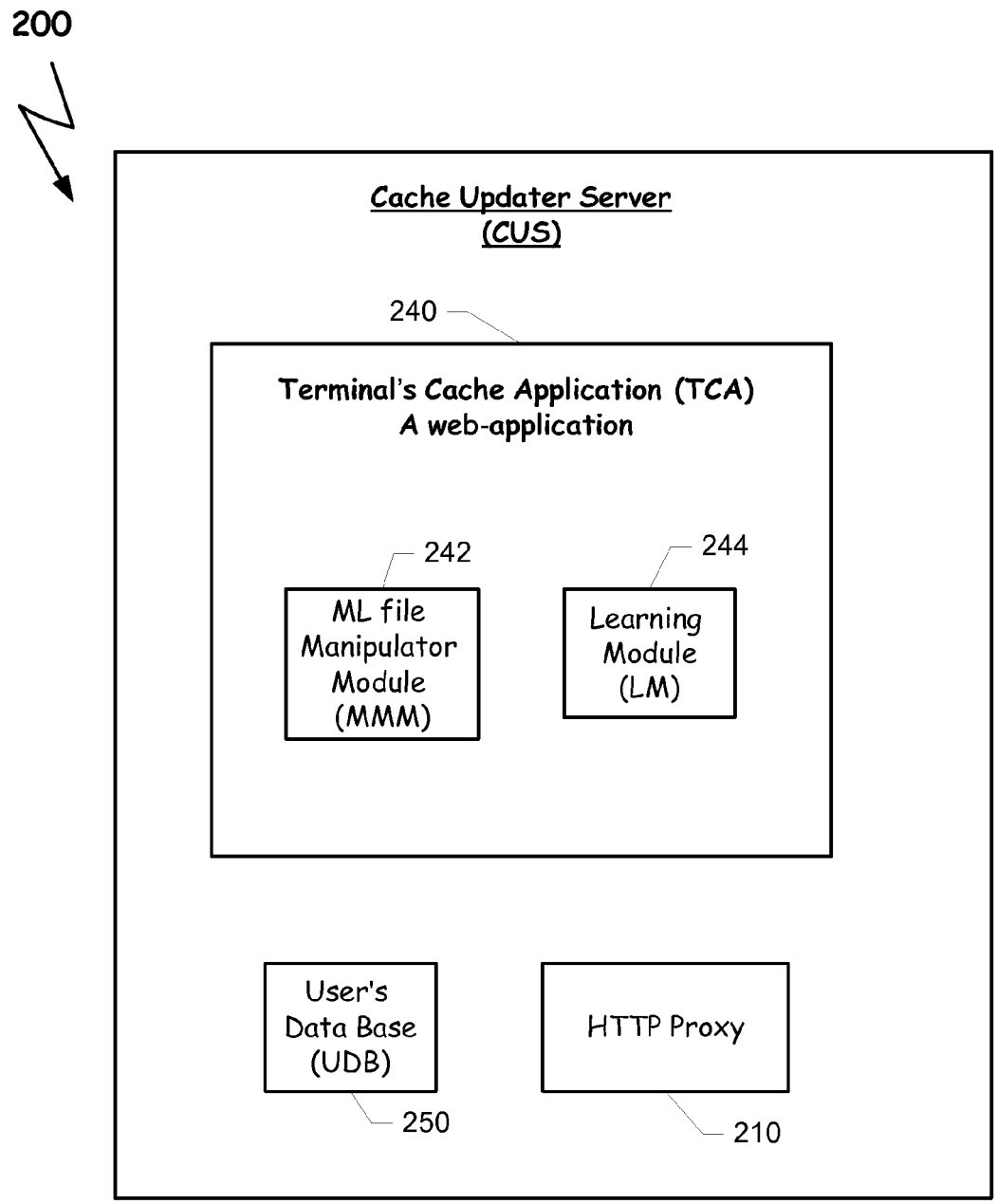
FIG. 2 illustrates a block diagram of relevant software modules of an exemplary embodiment of the present invention.

FIG. 2 is a block diagram depicting relevant elements of a cache updater server (CUS) 200 that operates according to an exemplary embodiment of the present invention. The illustrated CUS 200 may be associated with a NOC 130 (FIG. 1) as an intermediate node between the local communication unit 132 and router 138. In one exemplary embodiment of the present invention, the CUS 200 can be operative to follow sessions of surfing the portal 136 and/or one of the content servers 142. The CUS 200 may record information that can be used for updating the content of the cache of the terminals 110 as well as information that may be used for scheduling or queuing pre-push updated objects or pages. Furthermore, the CUS 134 may modify downloaded markup language (ML) files that are targeted to the terminals 110. Exemplary modifications can include, but are not limited to, (a) configuring the cache period value of relevant objects; and (b) adding additional browser's links to an ML file in order to force the browser applications, at the terminals 110, to pre-fetch updated objects.

Among other modules, an exemplary CUS 200 may comprise an HTTP proxy 210, a user's database (UDB) 250, and a terminal cache application (TCA) 240. An exemplary TCA 240 can be implemented as a web-application and among other logic modules, may comprise a learning module 244 and an ML file manipulator module (MMM) 244.

In exemplary embodiments of the present invention in which the communication between the modules of the NOC 130 is based on IP, HTTP proxy 210 can be adapted to handle the first four layers of the OSI seven layer communication stack. The layers can be the Physical Layer 1, Link Layer 2, Network Layer 3, and the Transport Layer 4 (the TCP stack). In exemplary embodiments of the present invention, in which the CUS 200 is transparent to the terminal 110 (FIG. 1), as well as to the content servers 136/142 (FIG. 1), the HTTP proxy 210 may behave as a transparent proxy and may use a redirector, for example. The transparent HTTP proxy 210 can collect packets coming from the plurality of terminals 110 (FIG. 1) toward the plurality of the content servers (142/136) and redirect requests and responses toward the web-application TCA 240. In an alternate exemplary embodiment of the present invention in which the CUS 200 can be configured as an HTTP proxy at the terminals 110 (FIG. 1), the redirector is not needed.

In the other direction (from the TCA 240), an exemplary HTTP proxy 210 can be adapted to get processed (modified) requests and/or responses from the TCA 240; to embed the modified requests and/or responses according to the communication protocol into IP packets and transmit the packets according to the destination address. The destination address can be the appropriate user via the local communication unit 132 (FIG. 1). Alternatively, the destination address can be the portal 136 (FIG. 1) or the appropriate content server 142 (FIG. 1) via router 138.

An exemplary UDB 250 can be a data base that can store an estimated replication of each one of the caches located in the terminals 110 (a cache simulator of each one of the terminals 110). The cache simulator can include the content of the objects that are assumed to be stored in the cache of the terminals 110. In another embodiment of the present invention, a general cache is used as a logical part of the UDB 250. The general cache stores (caches) the objects that were sent to all of the terminals 110. In such an embodiment of the present invention, each cache simulator stores the location information, in the general cache, of objects that are assumed to be stored in the cache of each terminal 110.

A user's table can be used for managing the UDB 250. Each entry in the user's table can be associated with a user and may contain information such as, but not limited to, (a) an ID number of the terminal 110, (b) the location in the UDB 250 that includes information that is relevant to the terminal 110, (c) information on the current one or more connections, in which the user is currently involved; (d) the location of the user's cache simulator in the UDB 250, etc. An exemplary ID number can be the MSISDN number. The MSISDN number can be retrieved from a notification that is sent by the local communication unit (FIG. 1) to the appropriate modules of the portal 136 including the CUS 134. Information on the relevant connection may include a URL that is associated with the connection. The UDB 250 and the user's table can be approached by different modules of the CUS 200 and is used in order to route information in between modules and to reach decisions during the operation of the CUS 200. Therefore it may include status information, such as but not limited to: an indication on the updated data that needs to be pre-pushed to the user, an indication on the time to push an updated data, etc.

An exemplary TCA 240 can be adapted to check whether a cache of a user requires an update. The update decision can be based on an entry in the user's table that is associated with the terminal 110. The user's cache table may contain information on the relevant objects that may exist in the cache of the terminal 110. Each entry may have information, such as: (a) the URL of the object; (b) the date of the last update; (c) its cache period value; (d) the size of the object; (e) the location of the content of the object in the UDB, etc. Then, a decision is made whether the cache simulator for the terminal that is stored in the UDB needs an update of one or more stored objects. In one exemplary embodiment, the decision can be based on dates of the last update versus the cache period of each object. In another embodiment, an update can be done periodically. Yet in an alternate embodiment of the present invention the TCA 240 may re-fetch each stored URL, based on the user's table, from its original content server and then it may determine whether there are changes and whether an update is needed. Alternatively, or in addition, a content server, such as the portal 136 may inform the CUS 200 as to the changes.

Yet in another exemplary embodiment of the present invention, from time to time or in a cyclic mode, the TCA 240 may initiate an update task. The update task may retrieve the user's table and re-fetch the objects that are stored in the cache simulator in UDB 250. An exemplary updating period can be few tens of minutes. Other embodiments may use any combination of the above-described methods, etc.

The TCA 240 receives requests and/or responses from the HTTP proxy 210 and analyzes the type of the request. The type can be a user's request for a page, an ML file that was sent as response to a request for a page, a request for an object, a response to an object request, etc. Based on the type of request, the TCA 240 may further process the requests or responses. Processing the requests or responses may include decisions on the surfing path that may be taken by the associated user. In order to determine an optional path, the TCA 240 may communicate with the LM 244 to collect information on the different options for next possible requests. The decision can be based on information that has been collected on the surfing procedure of the associated user. Such information can be retrieved from the relevant entry in the UDB 250. For example, based on past experience the associated user may proceed from the NEWS web page to the SPORTS web page and from there to the FOOTBALL web page, etc. In addition, the decision may be based on a momentary trend that is relevant to the timing of the current surfing. For example, if the surfing occurs close to a certain huge event, then, although the user's common path is NEWS, SPORTS, FOOTBALL this time, the high probability will be NEWS and from there to the web page that reviews the huge event.

After reaching a decision on the best possible future requests, the requests or responses may be transferred toward its destination via the HTTP proxy 210. If the data belongs to an ML file, information may be delivered by the LM 244 to the MMM 242 for further processing of the ML file. This information can be used later by the MMM 242 when determining which updated objects will be sent first. Then the ML file is transferred to the MMM 242 for further processing, etc. In addition, based on the type of the data, the TCA 240 may reach decisions about the cache that exists at the terminal 110.

The MMM 242, in its turn, may modify the ML file before forwarding it to the associated user. Several modifications can be performed on the ML file. One modification may include searching the ML file and changing the cache period value (the expiration date of the object) of the web page that is presented by the ML file as well as the cache period values of different objects that are embedded within the page. A second modification may be to add additional links (artificial links) to the ML file. The added links may point to URLs of objects that need to be pre-pushed in order to update the cache of the terminal 110. The selected objects can be based on the information that was sent by the TCA 240. Those updated objects are retrieved from the cache simulator for the terminal 110 in the UDB 250 and can be sent as an objects group (exemplary objects group can be multipart, archive, ZIP file, etc.) to the terminal 110 upon receiving a request to fetch an object from an artificial URL. In some embodiments of the present invention, future received ML files can be manipulated by the MMM 242 to include the artificial URLs. The artificial URLs can match the URL of the objects that were pushed to the cache of the terminal 110.

In an alternate embodiment, the pre-fetched or updated objects can be sent as common objects and not as an objects group. The decision of using an objects group or a common object can depend on the type of browser being used at the terminal 110 (i.e., whether the browser can or can not handle objects group).

In one exemplary embodiment, the artificial links can lead to or address a transparent object without adding a visual reference to this transparent object. The transparent object has a URL that is not stored in the cache of the terminal 110. Therefore, the artificial transparent object will be requested by the browser of the user device. The transparent URL can point to the location of the updated information in the cache simulator for the terminal 110 in UDB 250. Upon receiving a request to deliver the transparent object, an embodiment of the present invention may deliver one or more objects that can be later requested, by the user and/or the browser running on the terminal 110, and are not included in the cache of the terminal 110; or their updated version is not stored in the cache of the terminal.

Yet another exemplary embodiment of the present invention may use a non-transparent-push method. When a non-transparent-push method is used, a requested web page is modified by the MMM 242 to include a user selection object. The user selection object basically prompts or invites the user to select the selection object in order to update the cache. Upon receiving a cache update request, an exemplary embodiment of the present invention responds by delivering one or more objects that are needed for updating the cache of the terminal or by sending an ML file with a list of objects that are needed for the update.

The LM 244 may be used in order to collect browsing (surfing) procedures and trends and may include several predictive algorithms. The LM 244 may follow the browsing of a plurality of users 110 (FIG. 1) and determine one or more optional browsing trees. The optional surfing paths, with or without their probability to be selected by a user, may be used by the TCA 240 to determine a queue of updated objects to be delivered to their associated users. More information on the operation of the TCA 240 is disclosed below in conjunction with FIGS. 3 and 4.

Figure 3:
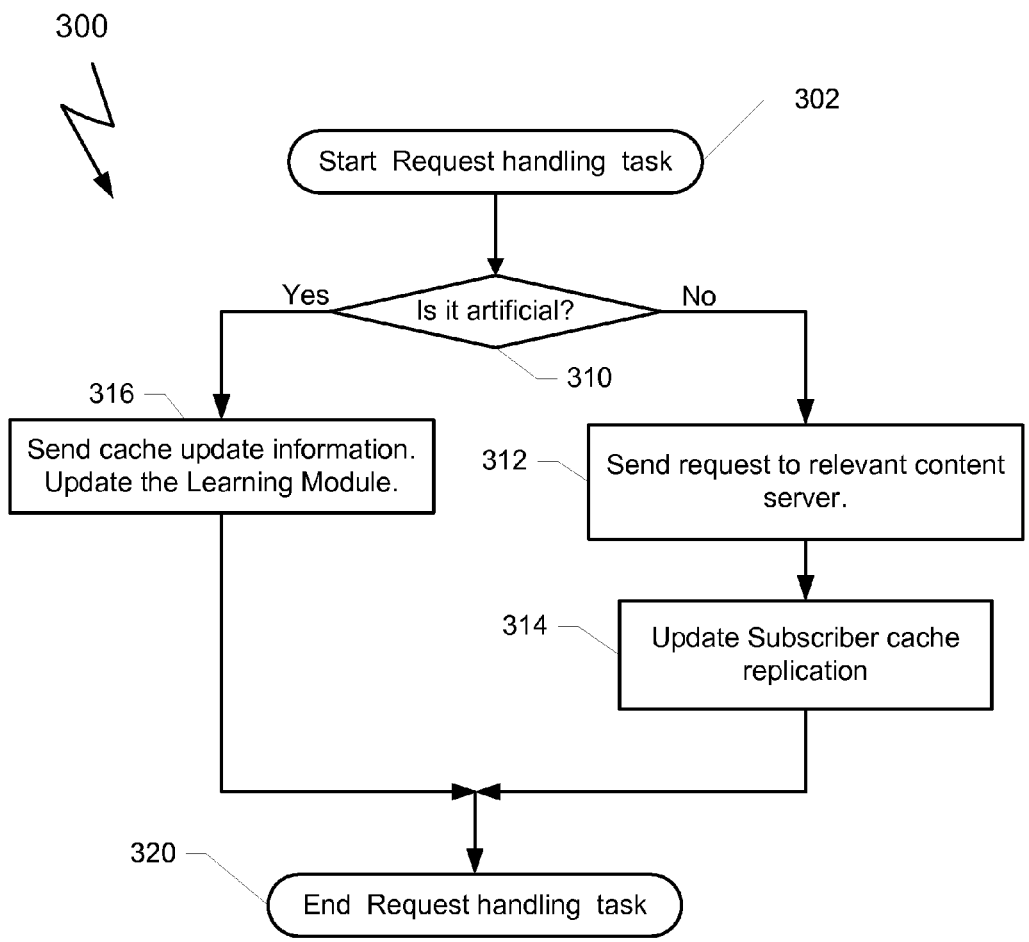
FIG. 3 illustrates a flowchart with relevant steps (processes) for handling a request cycle by an exemplary embodiment of the present invention.

FIG. 3 illustrates relevant steps of an exemplary method 300 for handling a request cycle by an exemplary CUS 134 (FIG. 1). Upon receiving a request, a decision is made 310 as to whether the request is an artificial one. An artificial request is a request that was initiated by a browser application, which is running at the terminal 110, during a parse of a modified ML file in response to an artificial link that had been added by the MMM 242 (FIG. 2) to the ML file. The decision can be based on the URL. If at step 310 it is an artificial request, then 316 the cache updated information that had been prepared by the TCA 240 (FIG. 2) and had been stored in the artificial URL can be sent to the terminal via HTTP proxy 210 (FIG. 2). In addition, information on this request can be transferred to the LM 244 in order to add information on the habits of the surfer. After sending the cache updated information the task can be terminated 320.

If 310 it is not an artificial request, then 312 the request is transferred toward its destination (a content server 136/142, FIG. 1). In addition, information on this request can be transferred 314 to the TCA 240 (FIG. 2) in order to adapt the information on the cache of the terminal 110 accordingly and/or to the LM 244 (FIG. 2). Information on such a request may indicate whether the user has changed his surfing habits—therefore the requested URL does not exist in his cache simulator, or that one of the assumptions on the cache in the terminal 110 is not correct (size of the cache for example) and is in need of being corrected. After updating the relevant modules the task can be terminated 320.

Figure 4:
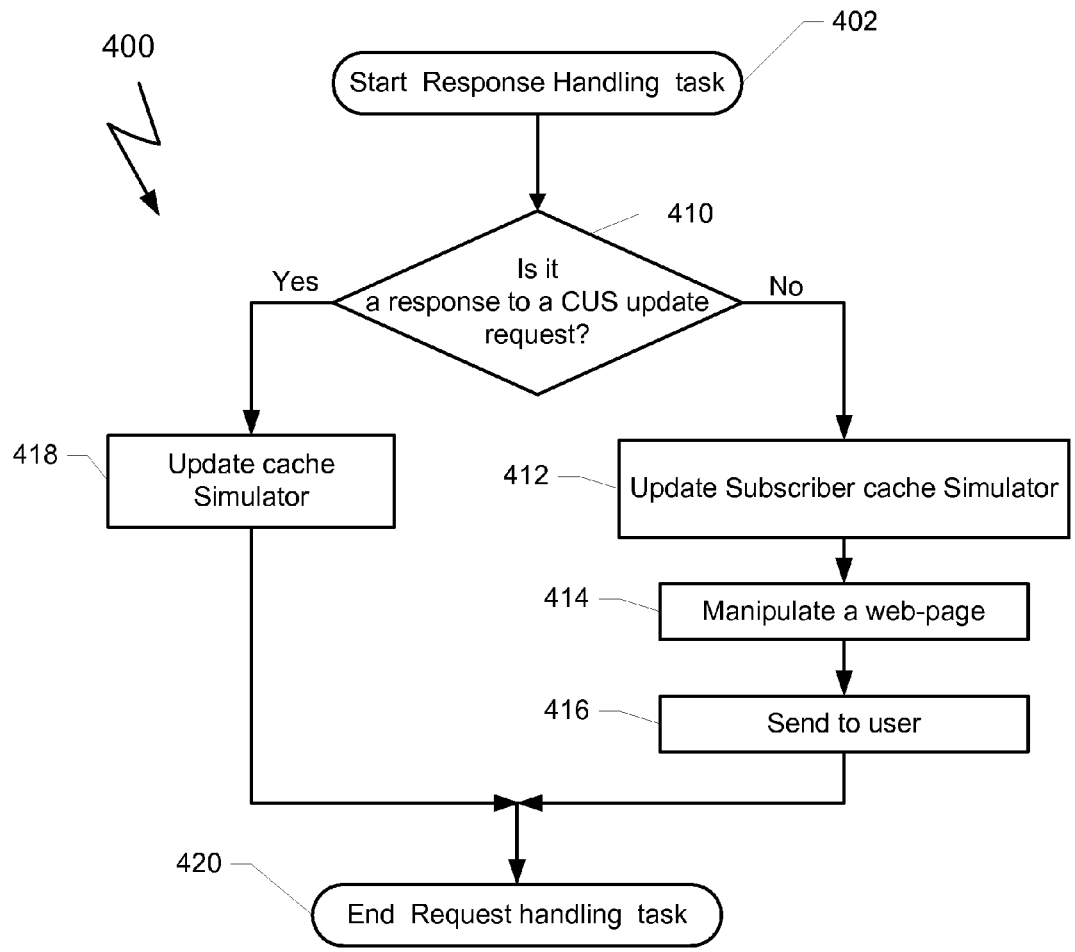
FIG. 4 illustrates a flowchart with relevant steps (processes) for handling a response cycle by an exemplary embodiment of the present invention.

FIG. 4 illustrates the relevant steps of an exemplary method 400 for handling a response cycle by an exemplary CUS 134 (FIG. 1). Upon receiving a response, a decision is made 410 as to whether the response is a response to a CUS update request. A CUS update request is a request that was initiated by the CUS 200 (FIG. 2) during a cache simulator update cycle. If 410 it is a response to a CUS update request, then 418 the information is stored in the cache simulator at an appropriate URL in the UDB 250 (FIG. 2) and the TCA 240 (FIG. 2) is updated accordingly. After storing the response in the cache simulator the task can be terminated 420.

However, if the response 410 is not a response to a CUS update request, then 412 the response is stored in the cache database for the terminal (simulator) and the TCA 240 (FIG. 2) is updated accordingly. If the response is an ML file of a requested web page, then the ML file can be manipulated 414 by the MMM 242 (FIG. 2). Exemplary manipulations can modify the cache period value of the ML file itself and/or the cache period value of one or more embedded objects. Usually the cache period can be increased. In addition, one or more artificial browser's links can be added to the received ML file, as it is depicted above, in order to push the browser to fetch update objects in order to update the cache of the terminal 110. In some embodiments of the present invention, the URL of objects that were pushed to the cache of the user device during an update session has a modified URL. In such embodiments, the manipulation of the ML file 414 may include searching for links to objects that have been pushed and replacing the original URL of the link to the modified one. The modified ML file is sent 416 toward the user via HTTP proxy 210 (FIG. 2). If the response is not an ML file then method 400 skips step 414 and the response is sent 416 toward the terminal 110 without modification. After sending 416 the response, the task can be terminated 420.

Furthermore, an exemplary embodiment of the present invention that includes a database with information on the cache of the terminal 110, methods 300 and 400 may be modified. For example, method 300 may be modified to identify the type of terminal; to retrieve its parameters from the database and to adapt the operation of the TCA 240 (FIG. 2) to match the parameters of the relevant cache.

Overall, this invention will improve the experience of a surfer during browsing the network and reduces the download time of a retrieved page.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. It will be appreciated that the above-described modules may be varied in many ways, including, changing the number modules, combining two or more modules into one, dividing the operation of a certain module into two or more separate modules, etc.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. An apparatus for automatically updating objects in a memory element associated with a user device (a cache), wherein the apparatus is communicatively coupled with a plurality user devices and one or more servers, the apparatus comprising:
    a user database (UDB), wherein the UDB comprises information which is relevant for automatically updating the memory element of a user device that is communicating via the apparatus;
    a module capable of:
        determining which objects that are stored in the UDB are needed for updating the memory element of the particular user.

2. The apparatus of claim 1, wherein the module is further capable of:
    a. receiving a file that is targeted toward a particular user, the file identifying one or more objects,
    b. modifying the file to invoke an update of the objects in the memory element with the objects stored in the UDB; and
    c. transferring the modified file toward the user.

3. The apparatus of claim 1, wherein the file is a markup language file that can be rendered by a user device, and the module is capable of modifying the file by changing the expiration date of the web page represented by the markup language file or the one or more objects in the markup language file.

4. The apparatus of claim 1, wherein the file is a markup language file that can be rendered by a user device, and the module is capable of modifying the file by adding artificial links into the markup language file that point to objects that need to be loaded into the memory element of the user device.

5. The apparatus of claim 4, wherein the artificial link points to a transparent object and is set to a value that does not exist in the memory element of the user device thereby causing the user device to access the UDB and receive updated objects.

6. The apparatus of claim 1, wherein the file is a markup language file that can be rendered by a user device, and the module is capable of modifying the file by adding a user selection object which, when selected issues a memory update request that results in one or more objects being loaded into the memory element of the user device to replace expired objects or add missing objects.

7. The apparatus of claim 1, wherein the apparatus further comprising a learning module for defining an update order.

8. A method for updating the cache of a user device, the method comprising the steps of:
    a. simulating the state of the cache of the user device;
    b. receiving a markup language file coming from a server toward the user device;
    c. identifying at least one object in the simulated cache that needs updating at the user device;
    d. modifying the received markup language file to invoke the updating of the cache of the user device; and
    e. transferring the modified markup language file toward the user device.

9. The method of claim 8, wherein the step of simulating the state of the cache of the user device further comprises the steps of:
    a. maintaining information on one or more objects that are assumed to be stored in the cache of user device;
    b. determining which one of the assumed objects needs to be update;
    c. fetching an updated object; and
    d. storing the updated object in the simulated cache in the place of the old object.

10. The method of claim 9, further comprises the steps of marking the updated object as an object to be delivered to the user device in order to update its cache.

11. The method of claim 8, wherein the step of modifying the markup language file further comprises the steps of:
    creating an artificial link that is not in the cache of the user device;
    associating the artificial link with objects to be downloaded to the cache of the user device; and
    placing an artificial link within the markup language page, thereby invoking the user device to access the associated objects.

12. The method of claim 11, further comprising the step of downloading the associated object in response to the user device accessing the artificial link.

13. The method of claim 8, wherein the step of modifying the markup language file further comprises the steps of:
    creating a user selection object;
    associating the user selection object with objects to be downloaded to the cache of the user device; and
    inserting the user selection object into the markup language file, thereby prompting a user to initiate a download of objects to update the cache.

14. The method of claim 13, further comprising the step of downloading the associated objects in response to an actuation of the user selection object.

15. The method of claim 8, wherein the step of modifying the markup language file further comprises the step of: changing the expiration date of the web page represented by the markup language file or the one or more objects in the markup language file.

16. The method of claim 8, wherein the step of modifying the markup language file further comprises the steps of:
    receiving a request from the user device;
    modifying the response to the request by adding a script which when executed, initiates a request for updated objects.

17. The method of claim 8, further comprising the steps of:
    observing user trends over a period of time;
    detecting that the markup language file is a particular file in the observed trend;

identifying a probable next markup language file request based on the detected markup language file and the trend; and modifying the markup language file to invoke the updating of objects in the probable next markup language file.

* * * * *